UNITED STATES PATENT OFFICE.

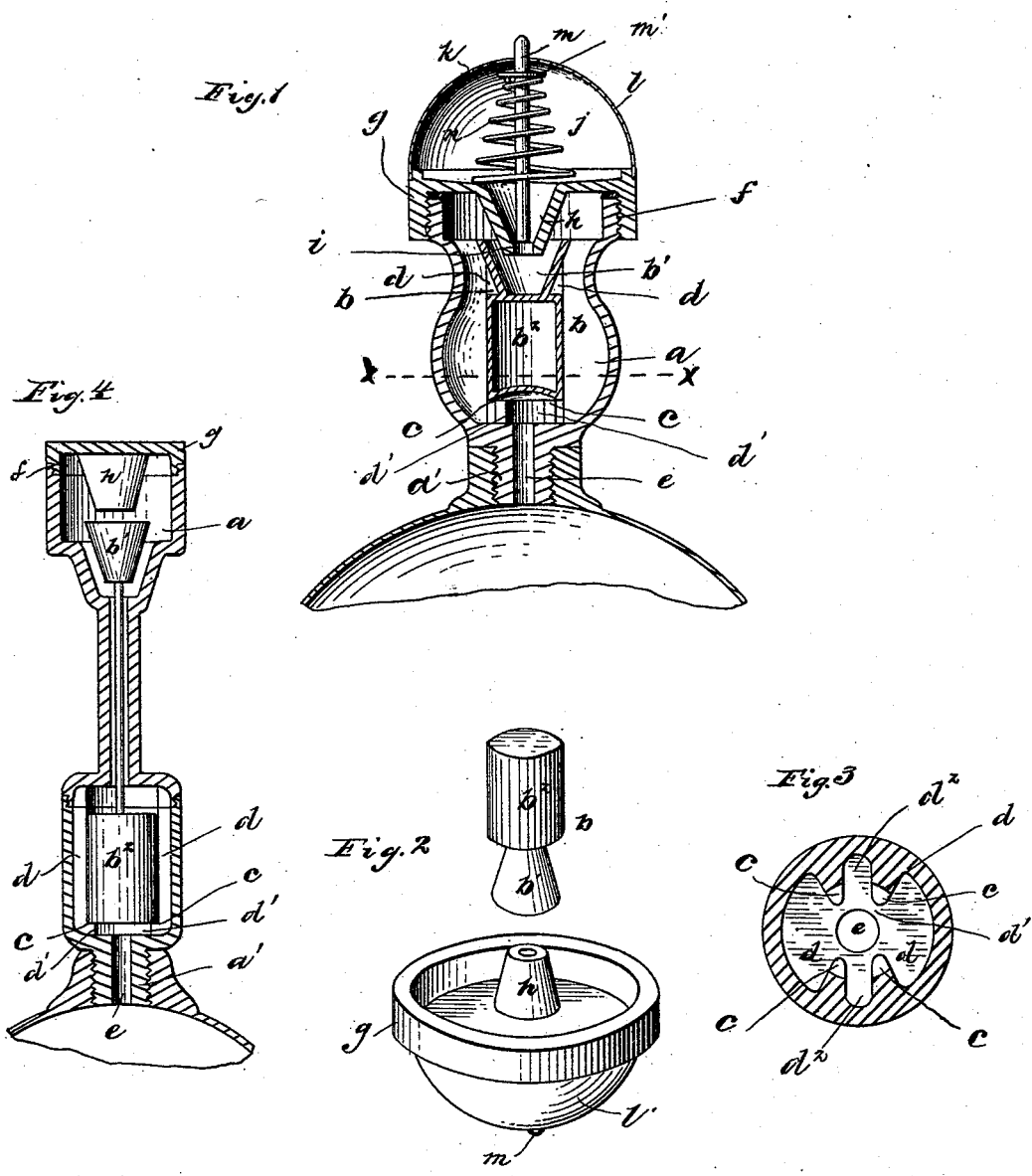

FRANK. K. WAY, OF DAYTON, OHIO, ASSIGNOR TO THE PASTEUR-CHAMBERLAND FILTER COMPANY, OF SAME PLACE.

AIR-VALVE.

SPECIFICATION forming part of Letters Patent No. 492,597, dated February 28, 1893.

Application filed June 28, 1889. Serial No. 315,946. (No model.)

*To all whom it may concern:*

Be it known that I, FRANK. K. WAY, a citizen of the United States, residing at Dayton, in the county of Montgomery and State of Ohio, have invented certain new and useful Improvements in Air-Valves, of which the following is a specification.

My invention relates to improvements in air-valves, and it relates particularly to air-valves adapted for use in connection with filters operating under the *système Pasteur;* and it relates also in its nature to improvements on the construction shown in my application Serial No. 264,396, filed February 17, 1888.

In the operation of filters of the Pasteur type, where a reservoir is used, it is essential that means be provided for allowing the air to escape from the reservoir while the water is filtering therein, and to allow the air to enter the reservoir when the water is drawn therefrom; the means being such as to prevent the water or other liquid filtering into the said reservoir from escaping when the reservoir becomes filled. In the operation of air-valves heretofore constructed for this purpose, difficulty has been experienced from the sluggish closing of the valve and from the spurting escape of a small quantity of the liquid from the reservoir when the valve is closed under considerable pressure. Difficulty has also been experienced from the sticking of the valve, which would prevent the water flowing from the reservoir. I overcome these difficulties by constructing the valve with a float adapted to buoy up the valve as the water rises in the valve chamber, and further by making the valve in the shape of a truncated cone placed in an inverted position, and adapted to fit over a valve seat of a similar shape, which valve seat projects into a valve chamber formed at the bottom with a valve support having lateral openings to permit the passage of the air and water around the said valve. I further provide an auxiliary chamber having an opening therein to permit the egress and ingress of the air, but adapted to prevent the escape of such liquids as may be forced out through the valve seat by the sudden closing of the valve. I further provide means for detaching the valve in case it should stick on the seat.

My invention consists in the constructions and combinations hereinafter described and pointed out in the claims.

In the accompanying drawings, Figure 1, is a vertical sectional elevation of a device embodying my invention, shown attached to the upper portion of a filter reservoir. Fig. 2, is a perspective view of the valve seat in an inverted position with the valve arranged above the same in its relative position for operation. Fig. 3, is a transverse sectional view on the line "X X," in Fig. 1 with the valve removed, showing the lower valve support. Fig. 4, is a view of a modification in the valve.

Like parts are indicated by similar letters of reference throughout the several views.

In the said drawings, $a$, represents the valve chamber: $b$, the valve therein. The valve, $b$, is preferably made of rubber or some similar flexible material. It consists essentially of two parts, the valve proper, $b'$, and a float or air chamber, $b^2$. It rests at the bottom on the valve support, which consists of supporting seats, $c\ c$, formed at the bottom of longitudinal ribs, $d\ d$, which extend vertically at each side of the valve chamber, lateral openings, $d'\ d'$, being thus formed at the bottom of said chamber under said valve, and vertical passages, $d^2\ d^2$, leading from said openings around the valve in said chamber. A main central opening, $e$, connects with said openings, $d'\ d'$, by extending into the valve chamber, $a$, through the lower part of the casing of the valve chamber, which is preferably provided with a projecting neck, $a'$, to fit into the top of the reservoir or to such other place as it is desired. The lower part of the valve chamber is preferably enlarged as shown to afford a free passage for the air, and, at the same time, to permit the water to rise freely therein and lift the valve, the said valve being guided in its vertical movement by the ribs, $d\ d$. The upper portion of the casing which forms the valve chamber, $a$, is preferably screw-threaded as shown at $f$, to receive a cap, $g$, which is screwed thereon, and on which the truncated valve seat, $h$, is located so as to project downwardly into the chamber, $a$.

This valve seat is provided with a central opening, *i*, which extends through the same into the auxiliary chamber, *j*, provided with an escape orifice, *k*, in the outer casing thereof. The auxiliary chamber, *j*, is preferably formed of a sheet metal, semi-spherically shaped casing, *l*, secured to the top of the cap, *g*.

Located centrally within the auxiliary chamber, *j*, and adapted to project through a suitable bearing in the top of the casing, *l*, is a push rod, *m*, provided with a collar, *m'*, near the top thereof, adapted to come against the casing, *l*. This push rod, *m*, extends at its other end into the opening, *i*, through the valve seat, *h*. A spring, *n*, resting at one end against the top of the cap, *g*, and at the other against the collar, *m'*, serves to keep the push rod pressed in its normal position above the bottom portion of the valve seat, *h*, as shown in Fig. 1.

The opening, *i*, which extends through the valve seat, *h*, into the auxiliary chamber, *j*, is preferably made funnel shaped as shown, and the bottom portion of the auxiliary chamber, *j*, is inclined slightly toward the center so that any liquid which may escape through said opening before the valve is closed passes readily back through the same when the valve is open.

The operation of the device it is thought, will be readily understood from the above description. As the reservoir is filled, the air passes up through the central opening, *e*, and around the valve, *b*, between the ribs, *d d*, in the valve chamber, *a*, and escapes through the opening, *i*, in the valve seat, *h*, to the auxiliary chamber, *j*, and from thence out through the orifice, *k*. When the reservoir is filled, the liquid therein presses the valve, *b*, tightly against the seat, *h*, and thus completely closes the opening, *i*, therein, and prevents the escape of the liquid. If there should be any escape resulting from the sudden closing of the valve, it is forced into the auxiliary chamber, *j*, and retained therein until the valve is opened, when it returns through the opening, *i*, into the valve chamber, *a*. Upon opening the reservoir to draw the water or other liquid therefrom, the valve becomes automatically opened and permits the air to enter and thus allows the water to flow from the reservoir. Should the valve stick, a slight pressure on the push rod, *m*, serves to loosen the same, and it falls to the supporting seats, *c c*, the push rod being returned to its normal position by the spring, *n*.

I preferably construct the air chamber or float which is connected to the valve, integral with said valve and of the same material, though it is evident it may be made of different material and connected to the valve in any desirable and suitable manner to accomplish the same result. If desired, the float and valve may be separated and connected together by a suitable valve-stem, as shown in Fig. 4.

It is obvious that the construction of the parts herein described admits of various modifications without effecting the operation or departing from the spirit of the invention. I reserve the right, therefore, to vary the constructions in any desirable or suitable manner as will readily suggest themselves to the mind of a mechanic.

Having thus described my invention, I claim—

1. The combination with an inverted, truncated, cone shaped valve of flexible material, located in a valve chamber having a central opening extending into said chamber, supporting seats, and the lateral openings connected to said central opening, of an inverted truncated valve seat having an opening therein, substantially as specified.

2. In an air-valve, the valve chamber and the auxiliary chamber arranged above the same, a longitudinal opening connecting said chambers through an inverted, truncated, cone shaped valve seat, a flexible valve adapted to fit on said seat, and a valve support in said valve chamber, substantially as specified.

3. In an air-valve, the valve chamber and auxiliary chamber connected by a longitudinal opening passing through a truncated, cone shaped valve seat, a flexible valve adapted to fit over said seat in said valve chamber, and a push rod extending through said auxiliary chamber and said valve seat, substantially as specified.

4. The combination with an inverted cone-shaped valve formed of rubber with an air-chamber integral therewith, and a corresponding valve-seat with which said valve is adapted to engage, of a push-rod extending through said valve-seat to disengage said valve, substantially as specified.

5. The combination with the valve chamber having the lower valve support and the lateral openings therein, an inverted, truncated, cone shaped valve adapted, normally, to rest on said support, a cap forming the top of said valve chamber provided with an inverted, cone shaped valve seat with a central opening therein, an auxiliary chamber above said cap connected to said opening, an outlet opening to said auxiliary chamber, a push rod in said auxiliary chamber passing into said valve seat, and a spring adapted to return said push rod to its normal position when depressed, substantially as specified.

6. The combination with a valve chamber having a valve seat therein, of a valve adapted to rise against said seat, said valve being constructed of rubber and formed with an air chamber below said valve, substantially as specified.

In testimony whereof I have hereunto set my hand this 3d day of June, A. D. 1889.

FRANK. K. WAY.

Witnesses:
PAUL A. STALEY,
FRANK R. PACKHAM.